Figure 1:
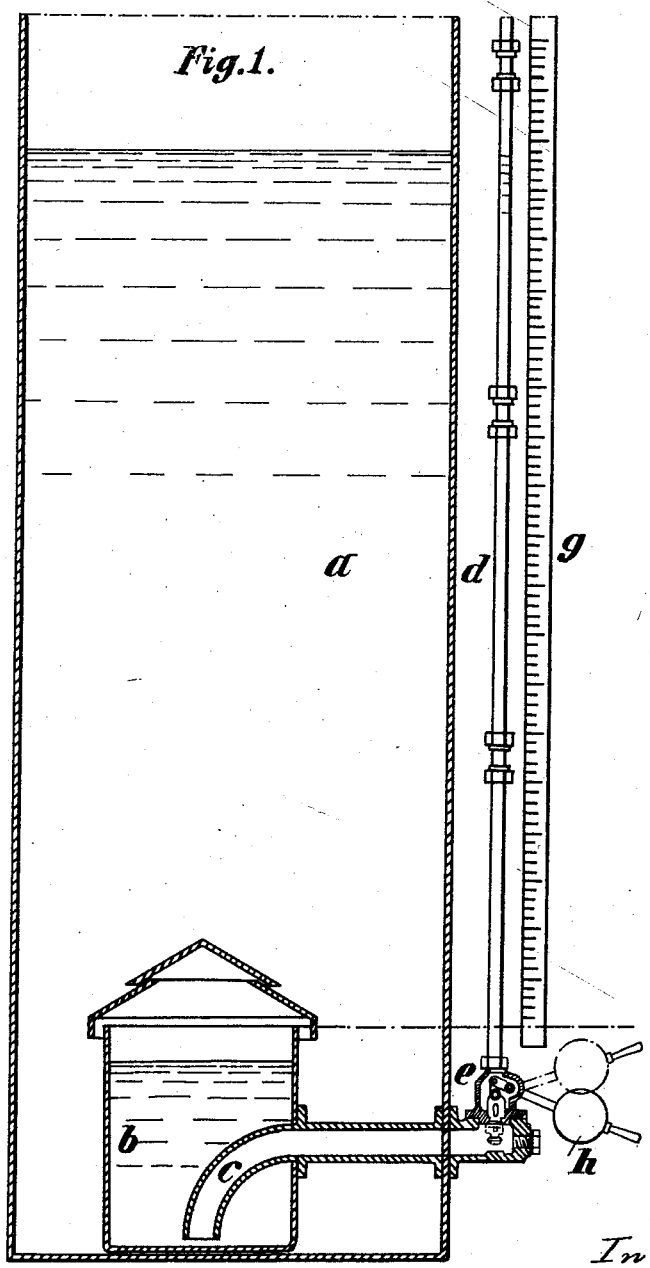

Dec. 29, 1925.

L. SCHRIEVER 1,567,758

OIL LEVEL INDICATOR FOR SHIPS' BUNKERS, OIL CONTAINERS, AND THE LIKE

Filed June 17, 1924    2 Sheets-Sheet 1

Inventor:
Lüder Schriever
By
Attorney.

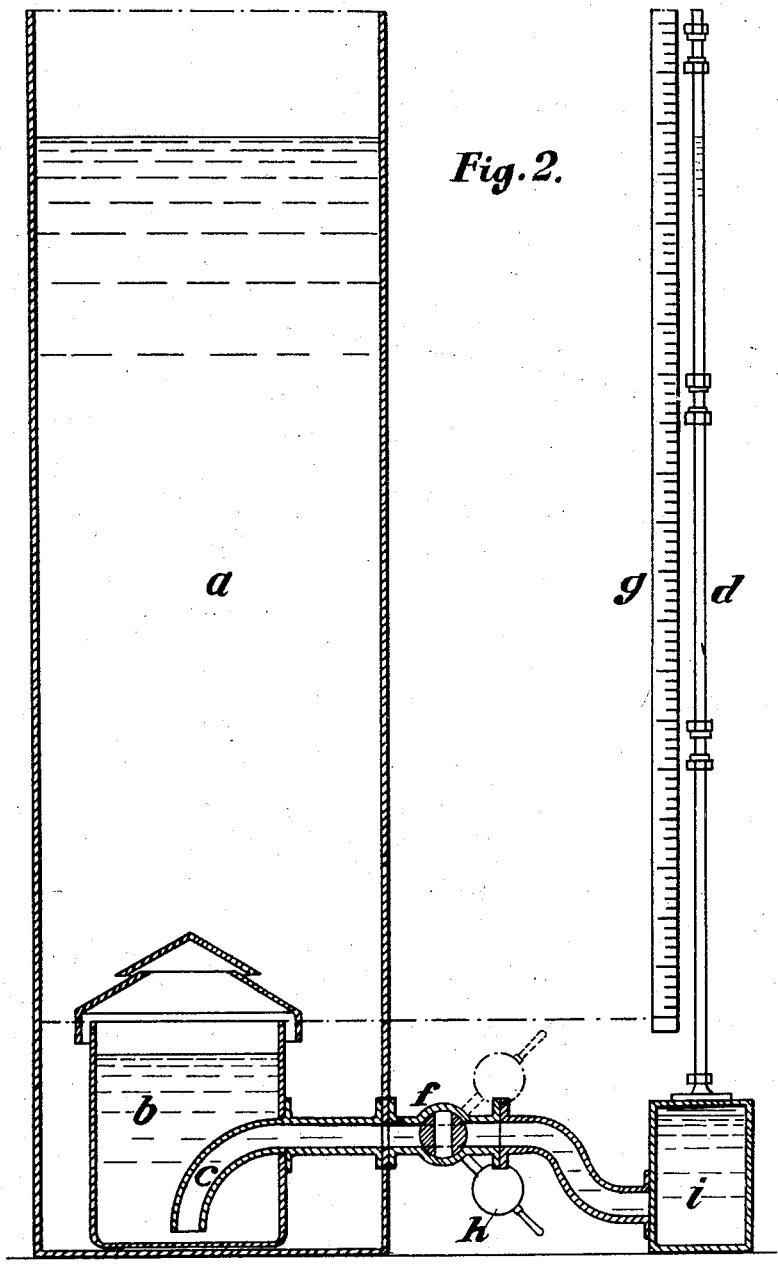

Patented Dec. 29, 1925.

1,567,758

UNITED STATES PATENT OFFICE.

LÜDER SCHRIEVER, OF DANZIG-LANGFUHR, FREE STATE DANZIG.

OIL-LEVEL INDICATOR FOR SHIPS' BUNKERS, OIL CONTAINERS, AND THE LIKE.

Application filed June 17, 1924. Serial No. 720,642.

*To all whom it may concern:*

Be it known that I, LÜDER SCHRIEVER, a citizen of the Free State Danzig, residing at Danzig-Langfuhr, Luisental 7, Free State Danzig, have invented certain new and useful Improvements in an Oil-Level Indicator for Ships' Bunkers, Oil Containers, and the like, of which the following is a specification.

The invention relates to means for indicating the level of the oil in ships' bunkers or other containers.

With viscous oil such as the fuel oil used on shipboard the difficulties of indicating the oil level are particularly great. Up to the present time there has been no reliable device by which the level of thick, sluggish oils in bunkers can be read directly. An easily read indicator showing the content of the bunker during the process of filling, pumping oil in or out, as well as other times, is, however, of the greatest value both for the safety of the ship and the running of the engines.

All devices used for determining the level of viscous oil in raised or sunken tanks, for example gauge tubes, or indicating devices working with compressed air or floats, are often unreliable in their indications, inconvenient to use and complicated in construction.

The type of water or oil level indicator most commonly used is a gauge glass in which the level can be directly read. It has been recommended, however, not to use round glass tubes for oil on account of the difficulty of preventing leakage of the oil. On account of the viscosity of the oil, moreover, these indicating devices must have very large cross section and this leads to extremely large and heavy constructions.

To avoid this difficulty oil level indicators have been proposed heretofore in which water is used as the indicating medium, but such gauges, including floats to control the flow between the oil and water columns, are not suited for use on board ship. The oil level indicator according to the invention obviates very simply the above-mentioned difficulties. Pure water or water in which salts are dissolved is used as the medium indicating the oil level in the ship's bunkers and an automatically operating device is provided to close the connection between the columns of oil and water. Alternatively, a thin oil may be used in the gauge glass and be separated from the heavy oil in the tank by an interposed body of water, as will be fully described hereinafter.

In the accompanying drawings, Fig. 1 is a view partly diagrammatic and partly in vertical section of my present invention. Fig. 2 is a similar view of a modified structure.

A small open water container $b$ inserted in the bottom of the oil bunker $a$, is maintained open and exposed to the pressure of the oil column in the oil bunker.

A tube $c$ of about 30 millimetres inner diameter is led almost to the bottom of the container $b$ and is connected with a chamber $e$ or (Fig. 2), a chamber $i$, which is connected with a gauge glass $d$ placed outside the bunker. The gauge glass $d$ is of the usual dimensions of about 17 to 22 millimetres in cross section. A non-return valve in the chamber $e$ is normally closed by the weight $h$ on the lever arm. This automatically acting safety device, which also operates if the glass is broken, is provided in order to prevent under all conditions any escape of the oil from the bunker through the gauge.

Instead of the chamber fitted with the non-return valve as shown in Fig. 1, a stop cock $f$ can be inserted in the pipe $c$ as shown in Fig. 2. In that case oil is used in the gauge glass and the container $b$ is connected with another water container $i$ which is disposed below the open end of the gauge glass $d$, so that the pressure of the oil column in the bunker is transmitted to the water in the container $i$, the water being specifically heavier than the oil and acting as an intermediate medium to cause the oil column in the bunker to counterbalance the oil in the gauge glass $d$ which is less viscous but of the same specific gravity as the oil in the bunker.

To safeguard against breakage of the glass and consequent escape of the oil from the bunker, the valve $e$ or cock $f$ is only opened when a reading is actually desired. For this purpose the non-return valve, which is closed fluid-tight by the weighted lever arm $h$, is held open by a handle bar for a time sufficient only to enable the position of the oil in the gauge glass to be observed.

The oil content of the bunker can be read by a scale $g$ provided by the side of the glass, taking into account the relation between the specific gravity of the water and that of the bunker oil. If oil of the same specific gravity is used in the gauge glass above the water which forms the intermediate medium, the oil column in the gauge glass will stand at the same level as the column in the bunker.

The action of the apparatus is as follows:

Before the oil is admitted to the bunker, the oil level indicator is filled with water; usually ordinary water will suffice, but with oils which are heavier than water the water must be made heavier by the solution of salts.

Since the zero point of the indicating device should coincide with the upper surface of the inner water container, the latter must be at the same level as the zero point on the glass, so that when the bunker is first filled, the oil pressing on the water level of the inner water container forces water to enter the gauge glass when the stop cock or valve is opened. The volume of the contents of a glass suitable for indicating the level in the deepest tanks is about two litres; in the inner water container there is consequently on first filling also about two litres which causes a small rise of level of the water in the intermediate container.

Equilibrium is established between the water column in the glass and the oil column of the bunker when these are connected by opening the cock or valve; the heights of the two columns are proportional to their specific gravities. The volume may be shown in cubic metres or centimetres on the scale $g$ provided by the side of the gauge glass. The weight in kilos or tons can then be easily calculated or, alternatively, the weight in tons can be read off on a correspondingly placed, suitable scale if oil is used in the gauge glass.

I claim:

1. Means for showing the level of the oil in oil containers, the said means comprising a receptacle containing water and in communication with the bottom of the said container and exposed to the pressure due to the level of the oil therein, an indicating gauge glass placed outside said container, means for connecting the interior of said receptacle and said gauge glass means for automatically closing said connection and means for manually opening said connection, when said level is to be read.

2. Means for showing the level of the oil in oil containers, the said means comprising a receptacle containing water and in communication with the bottom of the said container and exposed to the pressure due to the level of the oil therein, an indicating gauge glass placed outside said container, means for connecting the interior of said receptacle and said gauge glass, a device normally closing the connection between said receptacle and said gauge glass, including a weighted lever to maintain it in the closed position and manually operated when said level is to be indicated.

3. Means for showing the level of the oil in oil containers, the said means comprising a receptacle containing water made specifically heavier by the solution therein of soluble salts said receptacle being placed at the bottom of the said container and the water therein being exposed to the pressure due to the level of the oil, an indicating gauge glass placed outside said container, means for connecting the interior of said receptacle and said gauge glass, means for automatically closing said connection and means for manually opening said connection, when said level is to be read.

4. Means for showing the level of the oil in oil containers, the said means comprising a receptacle containing water and placed at the bottom of the said container, and exposed to the pressure due to the level of the oil therein, an indicating gauge glass placed outside said container, a second water receptacle into the closed upper end of which said gauge glass is inserted, oil on the surface of the water in said second receptacle, said oil having less viscosity than, but of the same specific weight as, the oil in said container, means for connecting said water receptacles, means for automatically closing said connection and means for manually opening said connection.

5. Means for showing the level of the oil in oil containers, the said means comprising a receptacle containing water and placed at the bottom of the said container and exposed to the pressure due to the level of the oil therein, an indicating gauge glass placed outside said container, a second water receptacle into the closed upper end of which said gauge glass is inserted, the second receptacle being connected to the first receptacle oil on the surface of the water in said second receptacle, said oil having less viscosity than, but of the same specific weight as, the oil in said container, a device normally closing the connection between said receptacles including, a weighted lever connected to said device automatically operating to maintain it in the closed position and adapted to be manually operated when said level is to be indicated.

6. Means for showing the level of the oil in oil containers, the said means comprising an open receptacle containing water and placed at the bottom of said container, a second closed receptacle containing water placed outside said oil container, a gauge glass the lower end of which is immersed in the water of said second receptacle, a pipe, one end of which opens near the bottom of the first-named receptacle and the other end opens into said second receptacle, a stop cock on said pipe, a weighted handle attached to said stop cock, oil on the surface of the water of said second receptacle, said oil having the same specific gravity as, but less viscosity than, the oil in the said container.

In testimony whereof I have affixed my signature.

LÜDER SCHRIEVER.